(12) United States Patent
Bolasna et al.

(10) Patent No.: US 8,649,126 B2
(45) Date of Patent: Feb. 11, 2014

(54) AIR BEARING SURFACE OF A HEAD SLIDER IN A HARD DISK DRIVE

(75) Inventors: Sanford A. Bolasna, San Jose, CA (US); Weidong Huang, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 471 days.

(21) Appl. No.: 12/533,870

(22) Filed: Jul. 31, 2009

(65) Prior Publication Data
US 2011/0026164 A1 Feb. 3, 2011

(51) Int. Cl.
G11B 5/60 (2006.01)

(52) U.S. Cl.
USPC .................. 360/235.4; 360/235.7; 360/236.3; 360/236.5

(58) Field of Classification Search
USPC ................ 360/235.7, 236.4, 236.5, 236, 237, 360/235.4, 236.3
See application file for complete search history.

(56) References Cited

U.S. PATENT DOCUMENTS

| | | | |
|---|---|---|---|
| 6,021,020 A | 2/2000 | Itoh et al. | |
| 6,275,467 B1 * | 8/2001 | Wang et al. | 369/300 |
| 6,445,543 B1 | 9/2002 | Gui et al. | |
| 6,556,381 B2 | 4/2003 | Kohira et al. | |
| 6,560,071 B2 | 5/2003 | Chapin et al. | |
| 6,603,639 B1 | 8/2003 | Polycarpou et al. | |
| 6,661,611 B1 | 12/2003 | Sannino et al. | |
| 6,799,365 B2 | 10/2004 | Boutaghou | |
| 6,920,015 B2 | 7/2005 | Mundt et al. | |
| 6,937,440 B2 | 8/2005 | Rajakumar et al. | |
| 6,956,719 B2 | 10/2005 | Mundt et al. | |
| 7,154,709 B2 * | 12/2006 | Rao et al. | 360/235.8 |
| 7,265,943 B2 | 9/2007 | Boutaghou et al. | |
| 7,706,095 B2 * | 4/2010 | Boutaghou et al. | 360/75 |
| 2002/0008939 A1 | 1/2002 | Boutaghou et al. | |
| 2007/0121251 A1 * | 5/2007 | Yoshida | 360/236.3 |
| 2007/0206326 A1 | 9/2007 | Zhang | |

FOREIGN PATENT DOCUMENTS

JP  2007287287  11/2007

* cited by examiner

*Primary Examiner* — Will J Klimowicz
*Assistant Examiner* — Carlos E Garcia
(74) *Attorney, Agent, or Firm* — Patterson & Sheridan, LLP (57) ABSTRACT

A head slider for supporting a head over a magnetic disk in a hard disk drive, and a method of making the head slider are disclosed. The air bearing surface (ABS) of the head slider includes a relatively deep recess in front of a trailing pad and an island pad. A recess is formed between the trailing pad and the island pad of the ABS. In operation, the recess may reduce the peak pressure of the ABS, resulting in a reduced mid disk (MD) hump without a reduction in other performance parameters. The reduction in peak pressure may also reduce lubrication pick-up from the magnetic disk.

12 Claims, 8 Drawing Sheets

AIR BEARING SURFACE OF A HEAD SLIDER IN A HARD DISK DRIVE

BACKGROUND OF THE INVENTION

1. Field of the Invention

Embodiments of the invention generally relate to a head slider within disk drive data storage devices.

2. Description of the Related Art

In an electronic data storage and retrieval system, a magnetic head typically includes a read/write transducer for retrieving and storing magnetically encoded information on a magnetic recording medium or disk. A suspended head slider supports the magnetic head. In operation, the head slider rides on a cushion or bearing of air above the surface of the disk as the disk is rotating at its operating speed. The head slider includes an air bearing surface (ABS) designed to generate an air bearing force that counteracts a preload bias urging the head slider toward the disk. The head slider flies above and out of contact with the disk as a result of the ABS.

SUMMARY OF THE INVENTION

In one embodiment, the present invention is a head slider for supporting a magnetic head above a surface of a magnetic storage disk in a hard disk drive. The head slider includes a leading edge, a trailing edge, first and second side edges extending between the leading and trailing edges and an air bearing surface (ABS). The ABS has a trailing pad with a rear portion adjacent the trailing edge of the slider and first and second arms extending from the rear portion toward the leading edge of the slider, the arms forming a channel there between. The ABS further includes an island pad between the first and second arms and a recess formed between the first and second arms and between the island pad and the rear portion of the trailing pad.

In a further embodiment, the present invention is a hard disk drive having a magnetic storage disk and a head slider for supporting a magnetic head above a surface of the magnetic storage disk. The head slider includes a leading edge, a trailing edge, first and second side edges and an air bearing surface (ABS) facing, and adjacent to, the surface of the disk. The ABS has a trailing pad with a rear portion adjacent the trailing edge of the slider and first and second arms extending from the rear portion toward the leading edge of the slider, the arms forming a channel there between. The ABS further includes an island pad between the first and second arms and a recess formed between the island pad and the rear portion of the trailing pad.

In another embodiment, the present invention is a method of forming a head slider. The method includes providing a head slider having a leading edge, a trailing edge, first and second side edges and an air bearing surface (ABS). The method further includes etching the ABS to form a plurality of features at different heights. The features include a trailing pad, first and second arms extending from the trailing pad toward the leading edge of the slider and forming a channel there between, an island pad in between the first and second arm and a recess between the first and second arms and between the island pad and the trailing pad.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention relate to the control of a head slider's fly height over a magnetic disk in a hard disk drive. Several problems with prior art head sliders are encountered that affect fly height negatively. Some of these include: lubricant pick-up; high peak pressure between the head slider and the disk, which increases lubricant pick-up and affects the ability to efficiently compensate for fly height variations; mid disk (MD) hump; and insufficient stiffness of the head slider. Lubricant pickup occurs when lubricant coated on the disk collects on the head slider. Once collected on the head slider, the lubricant tends to interfere with the fly-height and result in poor magnetic interfacing between the head slider and the disk. Further, the high peak pressure associated with air pressure between the head slider and the disk may contribute to lubricant pickup. As the peak pressure increases, the ability to compensate and efficiency of any compensation for fly-height of the magnetic head decreases. MD hump problems are associated with the head slider flying higher at middle locations of the disk where the skew angle of the head slider is close to zero, as opposed to the fly heights at the inner diameter (ID) and outer diameter (OD) of the disk. If the head slider has insufficient stiffness, it may flex and distort during operation of the hard disk drive. Distortion of the head slider may affect the distance between the read/write head and the disk, which can result in poor magnetic interfacing between the two. Severe distortion may lead to more catastrophic failures caused by contact between portions of the head slider and the disk.

Embodiments of the invention may mitigate the above problems by providing a head slider having a relatively deep recess in front of a trailing pad of the head slider's ABS, with an island pad in front of the recess. Without being bound to theory, this configuration reduces the peak pressure between the head slider and disk, thereby reducing lubricant pick-up. The reduction in peak pressure also results in a reduction of lift at the mid disk location (zero skew angle), thereby reducing or even eliminating MD hump. The reduction in MD hump normally trades off with other important performance parameters such as RPM fly height sensitivity and altitude sensitivity. However, at least one embodiment of the invention mitigates the MD hump problem without any significant reduction in these other areas of performance.

Figure 1:
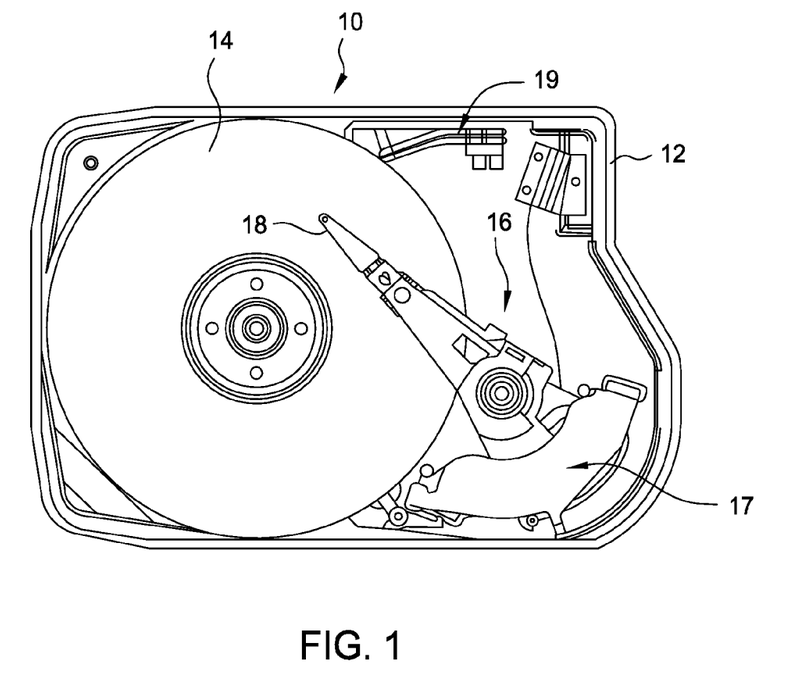
FIG. 1 shows an exemplary disk drive having a magnetic disk, and a head slider mounted on an actuator, according to embodiments of the invention.

FIG. 1 shows one embodiment of a magnetic hard disk drive 10 that includes a housing 12 within which a magnetic disk 14 is fixed to a spindle motor (SPM) by a clamp. The SPM drives the magnetic disk 14 to spin at a certain speed. A head slider 18 accesses a recording area of the magnetic disk 14. The head slider 18 has a head element section and a slider to which the head element section is fixed. The head slider 18 is provided with a fly-height control which adjusts the flying height of the head above the magnetic disk 14. An actuator 16 carries the head slider 18. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's air bearing surface (ABS) facing the magnetic disk 14, a pressure acts on the head slider 18. The head slider 18 flies low above the magnetic disk 14 as a result of this pressure balancing between the air and the force applied by the actuator 16 toward the magnetic disk 14. In some embodiments, the head slider 18 may have raised areas or portions (such as pads) that actually contact disk 14, as opposed to the slider head "flying" over the disk 14. In some embodiments, the disk drive 10 may include a ramp 19, where the head slider 18 is parked when the disk drive 10 is not in operation and disk 14 is not rotating.

Figure 2:
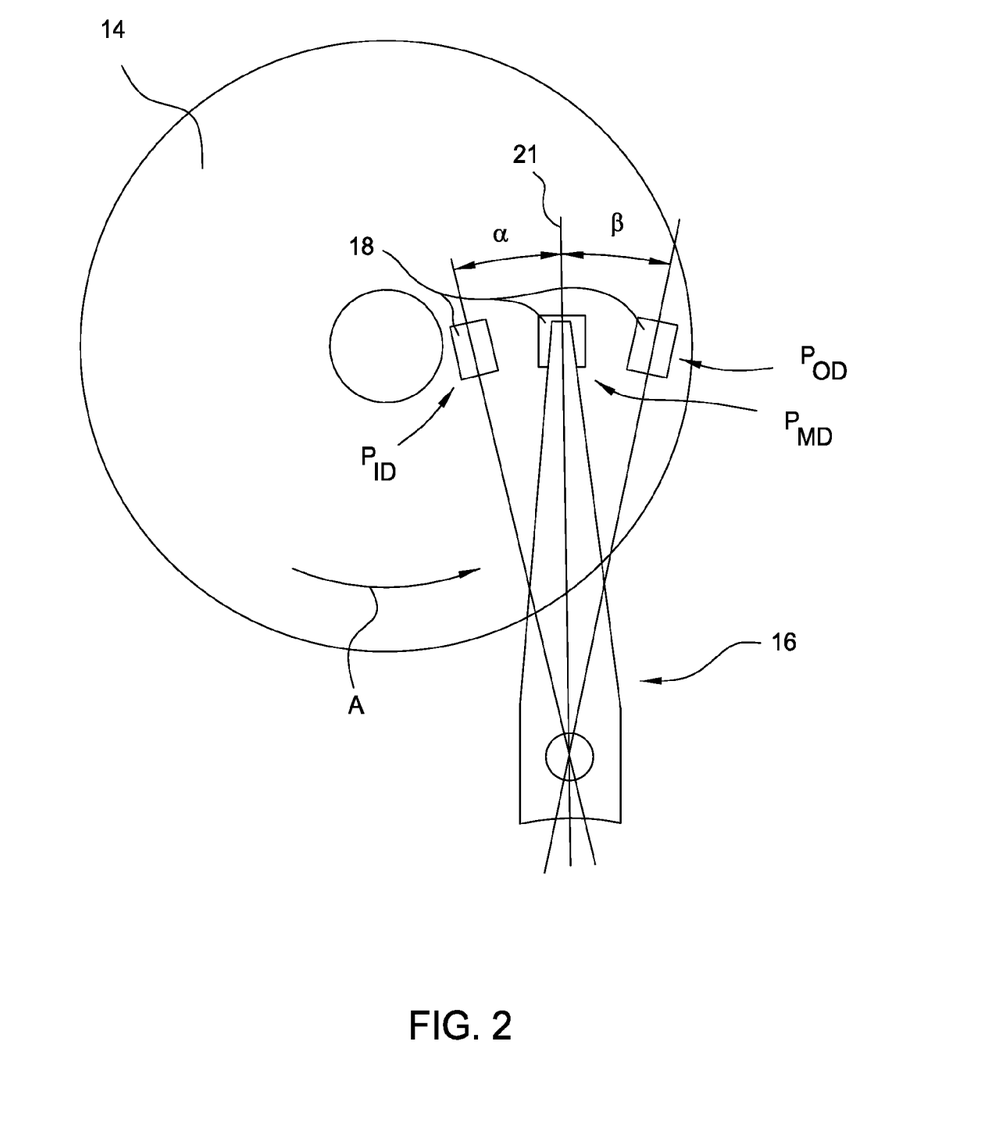
FIG. 2 is a diagram showing skew angles of the head slider at different positions with respect to the magnetic disk.

FIG. 2 is a diagram showing skew angles of the head slider 18 at different positions with respect to the magnetic disk 14. Actuator arm 16 supports the head slider 18 above the surface of the magnetic disk 14 at locations including an inner diameter (ID) position $P_{ID}$, an outer diameter (OD) position $P_{OD}$ and positions between $P_{ID}$ and $P_{OD}$. As the disk 14 spins, it produces airflow in a direction tangential to the disk in the direction the disk spins, as shown by arrow A. When the head slider 18 is at the mid-disk position $P_{MD}$, the centerline 21 of the head slider 18 is approximately aligned with the direction of the airflow produced by the disk 14, and the skew angle is therefore 0 (zero). When the head slider 18 is at other positions over the disk, however, the centerline 21 of the head slider 18 is not aligned with the direction of the airflow produced by the disk 14, and the angle of misalignment is known as the skew angle. As shown in FIG. 2, when the head slider is at the ID position $P_{ID}$, the skew angle is α, which is the maximum skew angle in the ID direction, and when the head slider is at the OD position $P_{OD}$, the skew angle is β, which is the maximum skew angle in the OD direction. The skew angle affects the aerodynamic characteristics of the head slider ABS. Generally, the greater the skew angle, the lower the lift produced for a given airflow velocity. In addition, the airflow velocity produced by the spinning disk 14 is dependent on the distance from the center of the disk. At head slider fly heights, the tangential airflow produced by the disk is very close to the tangential velocity of the disk. This tangential velocity is equal to $(RPM) \times 2\pi R$, where RPM is the rotations per minute of the disk, and R is the distance from the head slider location to the center of the disk. In general these effects combine to produce a fly height profile wherein the head slider tends to fly higher at the mid-disk position $P_{MD}$ and decreases in both directions to minimum values at the ID position $P_{ID}$ and the OD position $P_{OD}$. This phenomenon is known as mid disk (MD) hump as described above.

Figure 3:
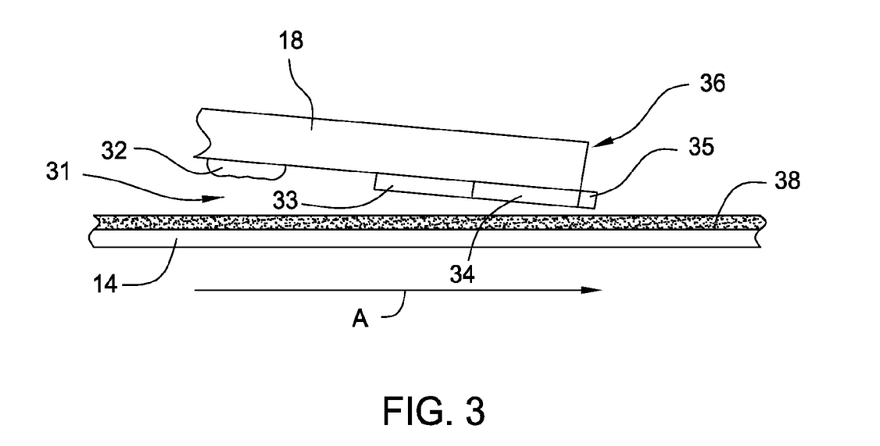
FIG. 3 is a side view of the head slider and magnetic disk of the disk drive of FIG. 1, according to embodiments of the invention.

FIG. 3 is a side view of the head slider 18 and the magnetic disk 14 of FIG. 1. Magnetic disk 14 is moving in the direction of arrow A, (as also shown in FIG. 2), and causes airflow in the same direction. This airflow flows over the air bearing surface (ABS) 31 of the head slider 18 and produces the lifting pressure described above. In one embodiment, head slider 18 includes raised areas such as front pad 32, side pads 33 and trailing pad 34. Trailing pad 34, located adjacent to and centered relative to, the trailing edge 36 of the head slider 18, may further include the read/write head 35 that writes and reads data to and from magnetic disk 14. Disk 14 has a lubricant 38 on its upper surface to protect the disk 14 from contact with the head slider 18 and/or other components of the disk drive.

Figure 4:
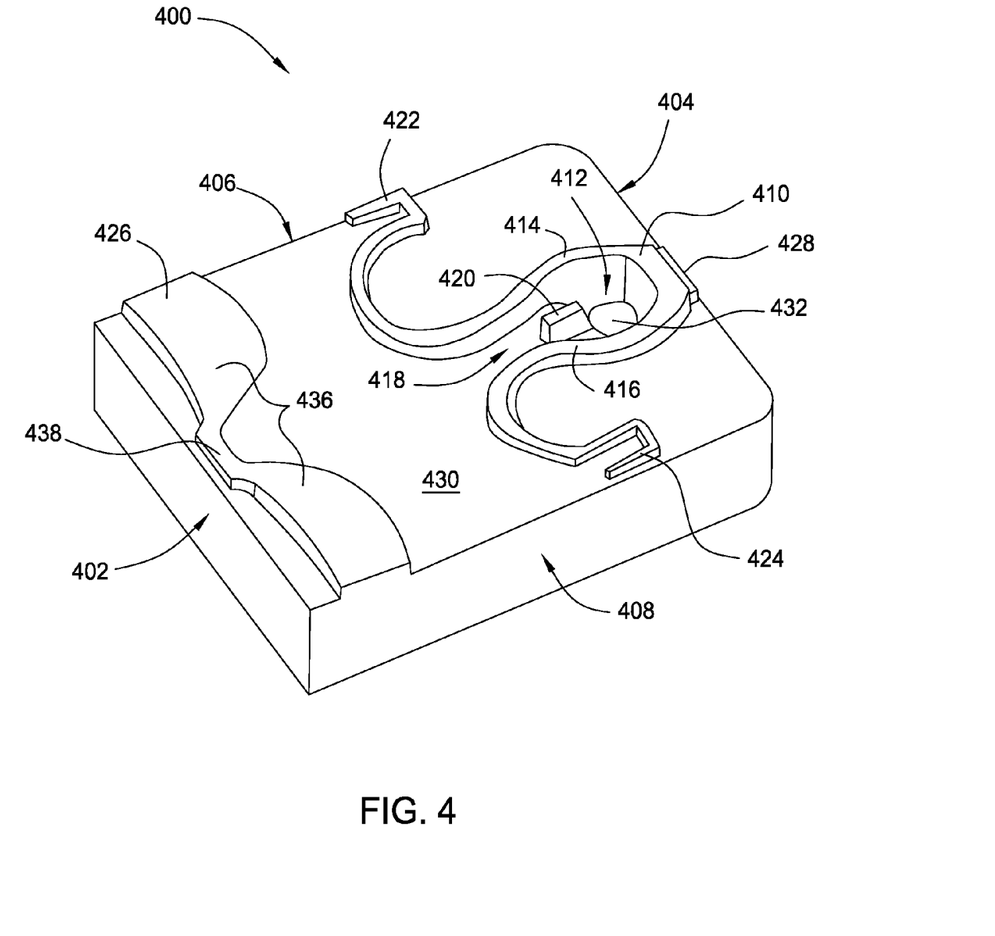
FIG. 4 is an isometric view of the bottom of a first embodiment of a slider head body used to make one embodiment of the head slider of the invention.

FIG. 4 is an isometric view of the bottom of a first embodiment of a head slider 400 of the invention. The head slider 400 includes a leading edge 402, a trailing edge 404, first 406 and second 408 side edges and an ABS (the bottom surface of head slider 400 as shown oriented upwards in FIG. 5). In one embodiment, head slider 400 is the head slider 18 of FIGS. 1-3, and the ABS of head slider 400 is the ABS 31 of head slider 18 which faces magnetic disk 14 in FIG. 3. The ABS has a surface 430 and a number of pads that are raised above this surface. A trailing pad 410 is adjacent to the trailing edge 404 of the head slider 400, and substantially centered relative to the trailing edge 404. First 422 and second 424 side pads are adjacent to the first 406 and second 408 side edges of the head slider 400, respectively. In some embodiments, as shown, side pads 422 and 424 have a substantially "U" shaped configuration, with the open part of the U facing the leading edge 402 of the head slider 400. According to some embodiments, trailing pad 410 has a read/write head 428 mounted thereon, on the rear portion of the trailing pad adjacent to the trailing edge 404 of the head slider 400. In some embodiments, the ABS also has a leading pad 426 adjacent to the leading edge 402 of the head slider 400. The leading pad 426 includes two relatively wide side portions 436 that are connected by a relatively narrow bridge portion 438. The bridge portion 438 is closer to the leading edge 402 of the head slider than the side portions 436. First 414 and second 416 arms are connected to the sides of the trailing pad 410 and extend towards the leading edge 402 of the head slider 400. Between the first 414 and second 416 arms is a longitudinal channel 418. In some embodiments, the first 414 and second 416 arms connect the first 422 and second 424 side pads, respectively, to the trailing pad 410. The portion of the arms 414 and 416 closest to the trailing pad 410, extend towards the leading edge of the head slider as described above. As the arms 414 and 416 extend further from the trailing pad 410 they form an arc toward the side edges 406 and 408 of the head slider and connect to the inner top portion of the U-shaped side pads 422 and 424, respectively. As is shown in FIG. 4, an island pad 420 is located between the first 414 and second 416 arms, substantially centered in the longitudinal channel 418. A recess 412 is formed between the first 414 and second 416 arms and between the island pad 420 and the trailing pad 410. In one embodiment, the pads 410, 422, 424 and 426 are elevated from about 10 nm to 1.0 µm above the surface 430 of the ABS. The recess 412 is significantly below surface 430 and has a bottom surface 432 that is between 10 nm and 10 µm below the top surface of the pads 410, 422, 424 and 426. In addition to the above described features, the ABS of head slider 400 may have other feature both above and below surface 430, as described below with reference to the various embodiments of the invention.

Figure 5A:
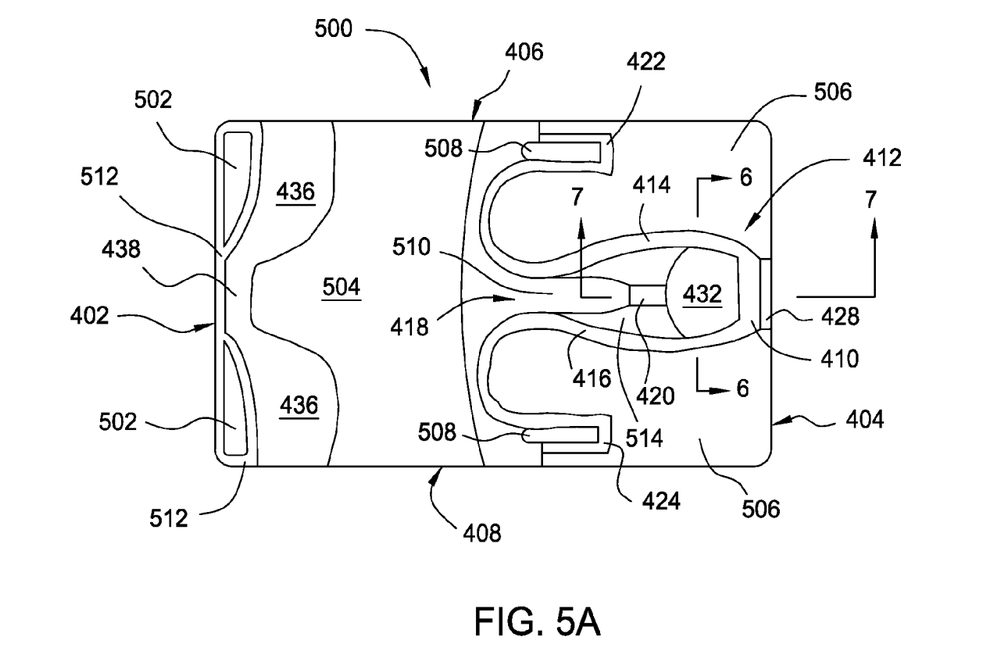
FIG. 5 is an isometric view of the bottom of a first embodiment of the head slider of FIGS. 1 and 2, showing the air bearing surface (ABS) of the head slider.
Figure 5B:
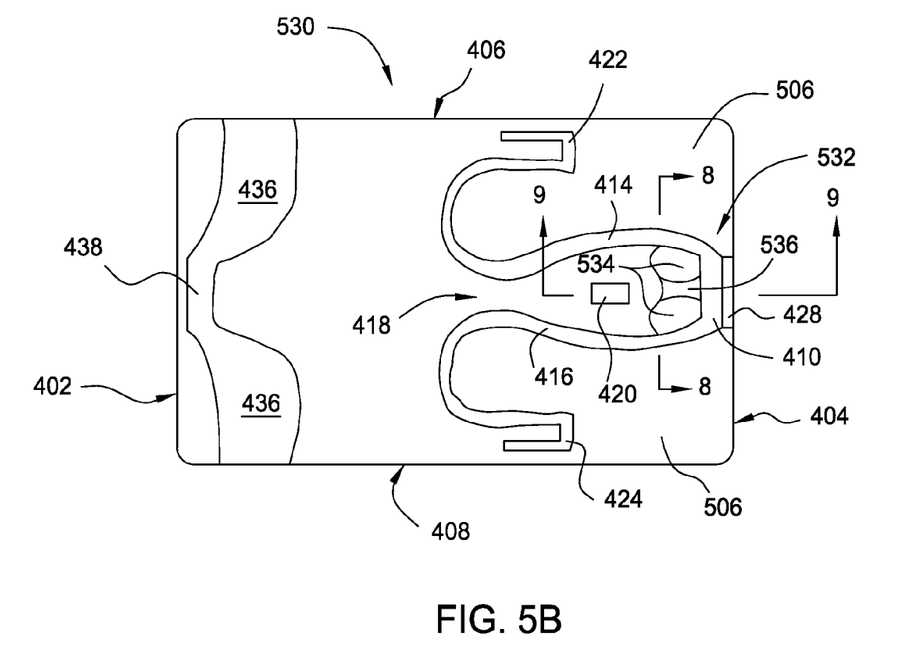
Figure 5C:
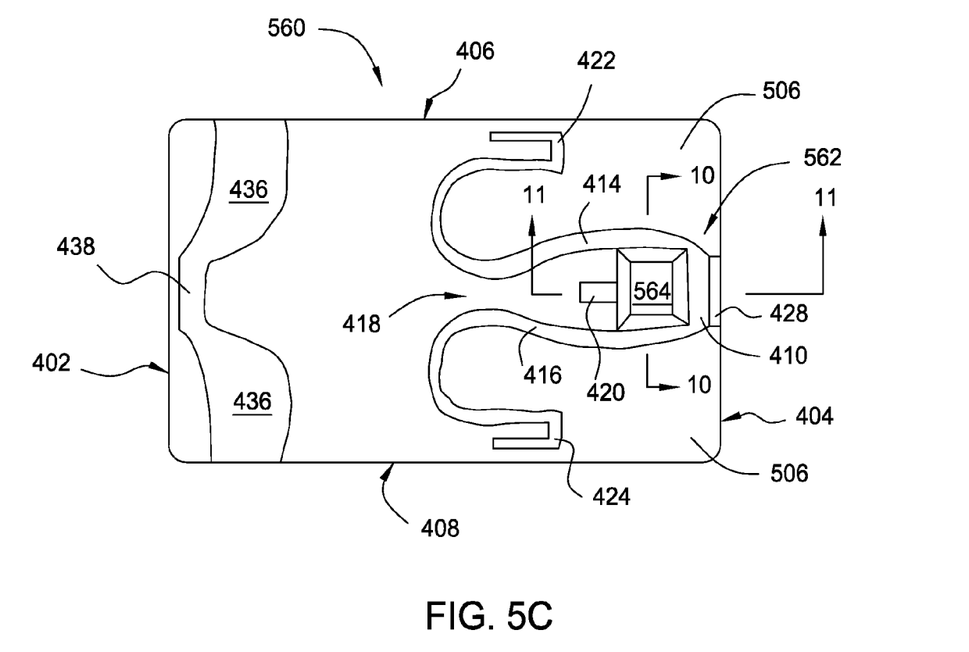

FIGS. 5A-5C show plan views of various embodiments of the ABS surface of head slider 400 of FIG. 4. In FIG. 5A, a first embodiment of an ABS 500 of head slider 400 is shown. Common features of FIG. 4 are labeled with the same reference designators in FIG. 5A. As is described more fully below, ABS 500 includes features at various etch depths. The pads 410, 420, 422, 424, 426 (which includes 436 and 438 in FIG. 5A) and arms 414 and 416, have a top surface that is at the highest level of the ABS (not etched). The portion 514 of longitudinal channel 418, which is between region 510 and recess 432, and region 512, which is in front of the leading pad portions 436 and 438, are at a first etch depth about 5 nm to 500 nm below the highest level of the ABS. A transverse channel 504, which is between the arms 414 and 416 and the leading pad 426, and region 506, which extends between the arms 414 and 416 and the trailing edge 404, are at a second etch depth about 10 nm to 5.0 µm below the highest level of the ABS. ABS 500 may also include pockets 502 in front of the side portions 436 of the leading pad 426, and pockets 508 in front of and in the "U" of the side pads 422 and 424, in some embodiments. The region 510, which includes a portion of the longitudinal channel 418 in front of (toward the leading edge 402) the island pad 420 and extends in front of the arms 414 and 416, the recess 412 and pockets 502 and 508 (when provided) are at a third etch depth about 10 nm to 10 µm below the highest level of the ABS.

Figure 6:
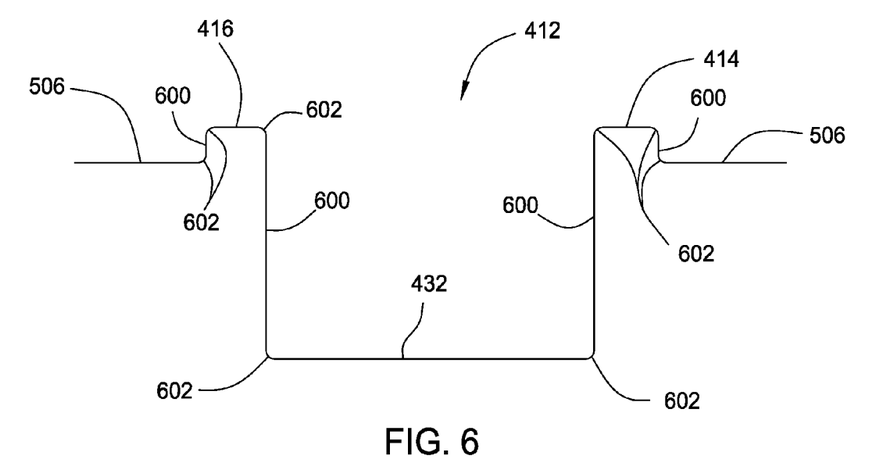
FIG. 6 is a cross section view taken through section line 6-6 of FIG. 5A.
Figure 7:
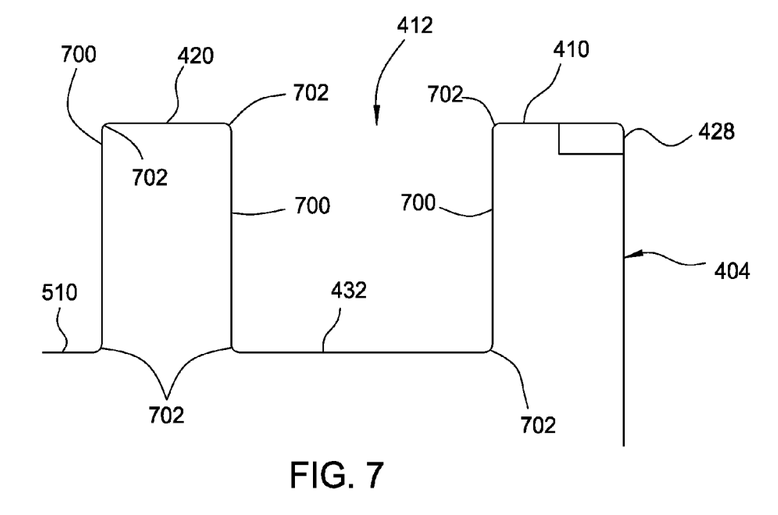
FIG. 7 is a cross section view taken through section line 7-7 of FIG. 5A.

Turning to FIG. 6, a cross section taken through section line 6-6 of FIG. 5A is shown. In FIG. 6, regions 506 and 512 are shown at the first etch depth, while arms 414 and 416 are shown to extend above region 506. Recess 412 is shown with its bottom surface 432, well below top surface of arms 414 and 416 and the region 506. FIG. 7 is a cross section taken through section line 7-7 of FIG. 5A. On the left side of FIG. 7, region 510 is shown at the third etch depth. Island pad 420 is shown to extend above region 510. Recess 412 is shown with its bottom surface 432, below the top surface of island pad 420 and approximately at the level of region 510. To the right in FIG. 7, trailing pad 410 is shown at the non-etched height of island pad 420, with read/write head 428 adjacent to the trailing edge 404 of the head slider 500. It should be noted that, in some embodiments, while the side surfaces 600 of recess 412 and arms 414 and 416 in FIG. 6 and the side surfaces 700 of recess 412 and island pad 420 in FIG. 7 are shown as vertical, these side surfaces 600 and 700 may be slanted, tapered or undulated, and need not be straight or vertical as shown. Further, it should also be noted that the corners 602 formed between region 506, arms 414 and 416 and bottom surface 432 and the side surfaces 600 in FIG. 6, as well as the corners 702 formed between regions 510, island pad 420, trailing pad 410 and bottom surface 432 and the side surfaces 700 in FIG. 7, may not be squared off as shown in the figures. Corners 602 and 702 may alternatively be formed as rounded corners, in some embodiments of the invention.

In FIG. 5B, a further embodiment of an ABS 530 of head slider 400 is shown. ABS 530 may include some or all of the features shown with respect to ABS 500 in FIG. 5A. Those features have been omitted from FIG. 5B for clarity. Common features of FIG. 4 are labeled with the same reference designators in FIG. 5B. In the embodiment shown in FIG. 5B, the recess 532 of the ABS is formed with two relatively deep portions 534 separated by a relatively higher portion 536. As with the other embodiments, recess 532 is located between arms 414 and 416 and between island pad 420 and trailing pad 410. The recess portion 536 is at an etch depth of about 10 nm to 10 µm below the highest level of the ABS, while the portions 534 are at the same level to an etch depth about 1.0 µm below the highest level of the ABS. In a further embodiment, the portions 534 are at an etch depth of about 10 nm to 10 µm below the highest level of the ABS. While in this embodiment the recess 532 includes three portions, in other embodiments the recess 532 may include any number of portions at the same or different levels, and the number of portions and levels should not be considered limiting as to the scope of the invention.

Figure 8:
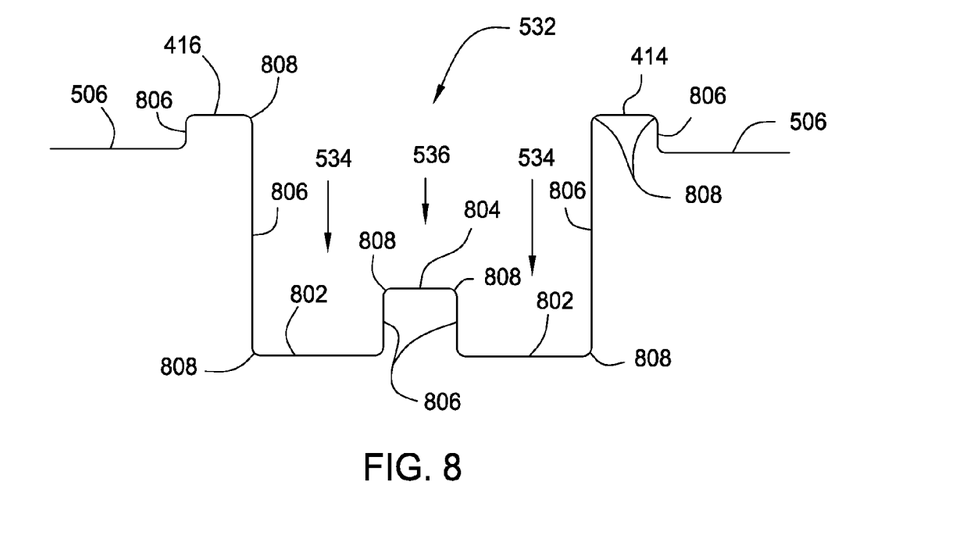
FIG. 8 is a cross section view taken through section line 8-8 of FIG. 5B.
Figure 9:
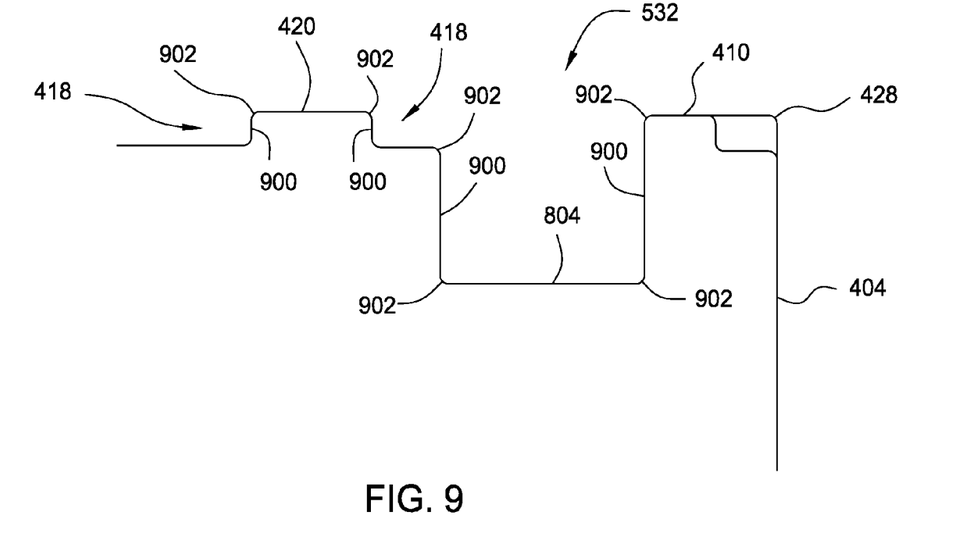
FIG. 9 is a cross section view taken through section line 9-9 of FIG. 5B.

Turning to FIG. 8, a cross section taken through section line 8-8 of FIG. 5B is shown. In FIG. 8, region 506 is shown at the first etch depth, while arms 414 and 416 are shown to extend above region 506. Recess 532 is shown with portions 534 and portion 536. Portions 534 have a bottom surface 802, and portion 536 has a bottom surface 804. Bottom surfaces 802 and 804 are shown well below the top surface of arms 414 and 416 and region 506. FIG. 9 is a cross section taken through section line 9-9 of FIG. 5B. On the left side of FIG. 9, longitudinal channel 418 is shown with island pad 420 therein. Recess 532 is shown with the bottom surface 804 of portion 536, well below the top surface of island pad 420. To the right in FIG. 9, trailing pad 410 is shown at the non-etched height of island pad 420, with read/write head 428 adjacent to the trailing edge 404 of the head slider 530. It should be noted that, in some embodiments, while the side surfaces 806 of recess portions 534 and 536 and arms 414 and 416 in FIG. 8 and the side surfaces 900 of recess 532 and island pad 420 in FIG. 9 are shown as vertical, these side surfaces 806 and 900 may be slanted, tapered or undulated, and need not be straight or vertical as shown. Further, it should also be noted that the corners 808 formed between arms 414 and 416 and bottom surfaces 802 and 804 and the side surfaces 806 in FIG. 8, as well as the corners 902 formed between island pad 420, trailing pad 410 and bottom surface 804 and the side surfaces 900 in FIG. 9, may rounded as shown in the figures. Corners 808 and 902 may alternatively be formed more rounded or as squared corners, in some embodiments of the invention.

In FIG. 5C, a further embodiment of an ABS 560 of head slider 400 is shown. ABS 560 may include some or all of the features shown with respect to ABS 500 in FIG. 5A. Those features have been omitted from FIG. 5C for clarity. Common features of FIG. 4 are labeled with the same reference designators in FIG. 5C. In the embodiment shown in FIG. 5C, the recess 562 of the ABS is formed substantially in the shape of a square hole with tapered side surfaces (best seen in FIGS. 10 and 11). As with the other embodiments, recess 562 is located between arms 414 and 416 and between island pad 420 and trailing pad 410. Recess 562 has a bottom surface 564 at an etch depth about 10 nm to 10 µm below the highest level of the ABS.

Figure 10:
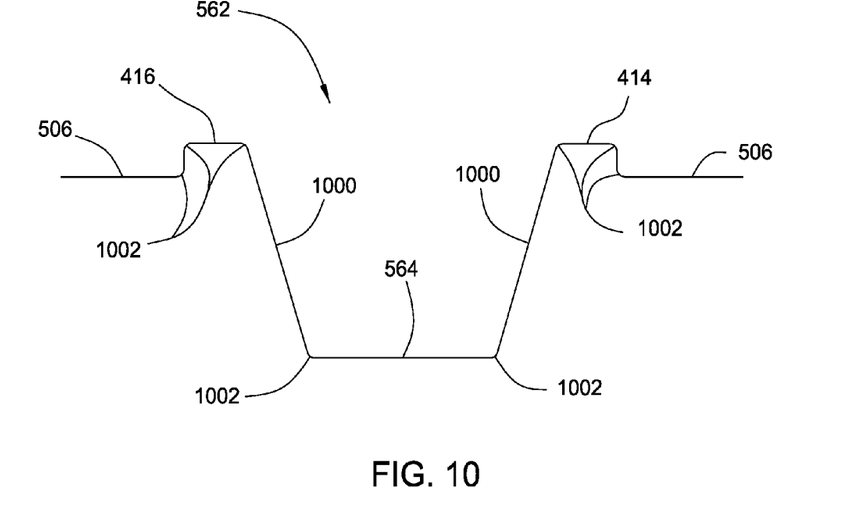
FIG. 10 is a cross section view taken through section line 10-10 of FIG. 5C.
Figure 11:
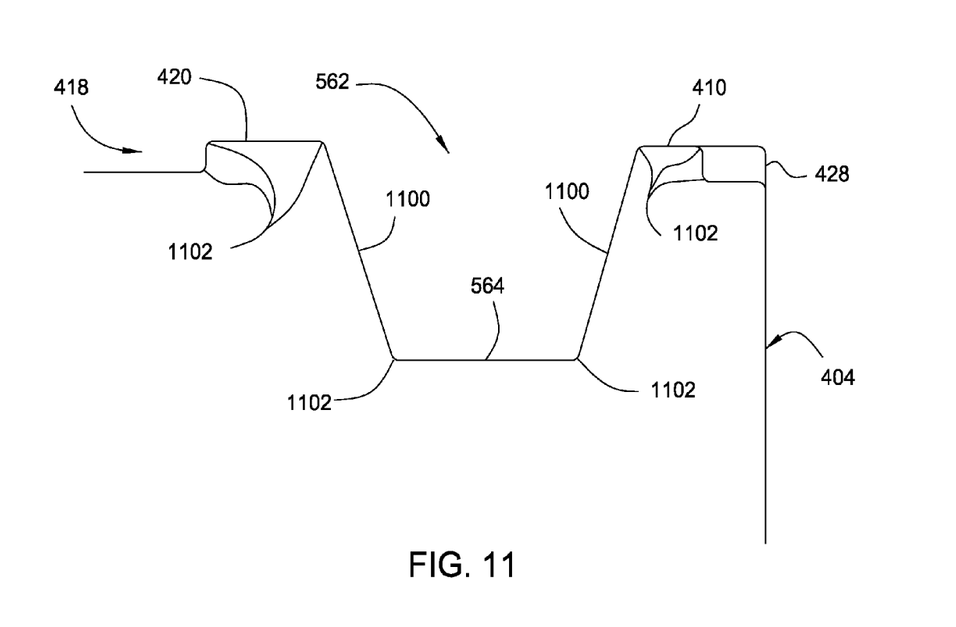
FIG. 11 is a cross section view taken through section line 11-11 of FIG. 5C.

Turning to FIG. 10, a cross section taken through section line 10-10 of FIG. 5C is shown. In FIG. 10, region 506 is shown at the first etch depth, while arms 414 and 416 are shown to extend above region 506. Recess 562 is shown with bottom surface 564 well below the top surface of arms 414 and 416 and region 506. In this embodiment, the side surfaces 1000 of recess 562 are tapered such that the top of the recess 562 has a greater area than the area of bottom surface 564. Vertical side surfaces (such as those shown with respect to other embodiments) or other configurations are also contemplated. With vertical side surfaces, the top of the recess 562 has an area substantially equal to the area of bottom surface 564. FIG. 11 is a cross section taken through section line 11-11 of FIG. 5C. On the left side of FIG. 11, longitudinal channel 418 is shown with island pad 420 therein. Recess 562 is shown with bottom surface 564, well below the top surface of island pad 420. To the right in FIG. 11, trailing pad 410 is shown at the non-etched height of island pad 420, with read/write head 428 adjacent to the trailing edge 404 of the head slider 560. Side surfaces 1100 of recess 562 are shown tapered, although vertical or other configurations are also possible. It should be noted that the corners 1002 formed between arms 414 and 416 and bottom surface 564 and the side surfaces 1000 in FIG. 10, as well as the corners 1102 formed between island pad 420, trailing pad 410 and bottom surface 564 and the side surfaces 1100 in FIG. 11, may be more or less rounded than as shown in the figures and alternatively may be formed as squared corners, in some embodiments of the invention.

Embodiments of a method of forming a head slider of the invention will now be described with respect to FIG. 5A. In FIG. 5A, the first embodiment of an ABS 500 of head slider 400 is shown as described above. ABS 500 includes features at various etch depths. To form the various features, a mask is provided for each etching process to protect those areas that are not etched in that process. The pads 410, 420, 422, 424, 426 and arms 414 and 416, have a top surface that is at the highest level of the ABS and are not etched. Thus, in one embodiment all of the masks will cover these features. In a first etch process, regions 506, 510 and 512 are etched to a first etch depth, while the first etch mask covers all other portions of the ABS. In a second etch process, the transverse channel 504 and the portion 514 of longitudinal channel 418 are etched to a second depth, while the second mask covers all other portions of the ABS. In a third etch process, pockets 502 and 508 are etched to a third depth, while the third mask covers all other portions of the ABS. In a fourth etch process, recess 412 is etched to a fourth etch depth, while the fourth etch mask covers all other portions of the ABS. While this embodiment provides a relatively simple process, four etch processes are required to form features at four depths.

A further embodiment of a method of forming a head slider of the invention will now be described, again with respect to FIG. 5A. To form the various features, this embodiment uses a method wherein a reduced number of etching processes may be used to form the same features as the method described above. As with the previous method, the pads 410, 420, 422, 424, 426 and arms 414 and 416, are not etched. Thus all of the masks will cover these features. In a first etch process, regions 506, 510 and 512, pockets 502 and 508 and recess 412 are all etched to a first etch depth, while the first etch mask covers pads 410, 420, 422, 424, 426, arms 414 and 416, the transverse channel 504, and the portion 514 of longitudinal channel 418. In a second etch process, the transverse channel 504, the portion 514 of longitudinal channel 41, pockets 502 and 508 and recess 412 are all etched to a second etch depth, while the second mask covers pads 410, 420, 422, 424, 426, arms 414 and 416 and regions 506, 510 and 512. In this manner, regions 506, 510 and 512 are etched to the first etch depth, while the transverse channel 504, the portion 514 of longitudinal channel 41 are etched to the second etch depth. Pockets 502 and 508 and recess 412 are all exposed to both the first and second etch process, and are therefore etched to a third etch depth, which is the sum of the first and second etch depths. In a third etch process, recess 412 is etched to the fourth etch depth, while the third etch mask covers all other portions of the ABS. In this embodiment three etch processes are used to form features at four depths. This not only reduces the number of processes and masks required, but also reduces the time required of subsequent etch processes, as the proceeding etch processes remove some of the material that is required to be removed in the subsequent etch processes.

One suitable etching process for forming the features on the ABS includes reactive ion etching (RIE), although other processes may be used. To form the tapered side surfaces 1000 and 1100 of recess 562, a directional etching process may be used. For example, an etch process may be used where the etch mechanism (laser, ion beam, etc.) is tilted at an angle to the ABS surface to produce the tapered side surfaces.

While the foregoing is directed to embodiments of the present invention, other and further embodiments of the invention may be devised without departing from the basic scope thereof, and the scope thereof is determined by the claims that follow.

What is claimed is:

1. A head slider for supporting a magnetic head above a surface of a magnetic storage disk in a hard disk drive, the head slider comprising:
   a leading edge;
   a trailing edge;
   a transverse channel disposed between the leading edge and the trailing edge;
   first and second side edges extending between the leading and trailing edges;
   an air bearing surface (ABS), comprising:
      a trailing pad comprising:
         a rear portion adjacent the trailing edge of the slider;
      first and second arms extending from the rear portion toward the leading edge of the slider and forming a channel there between, wherein the first and second arms are connected to the trailing pad; and
      an island pad between the first and second arms, wherein the island pad is in the same plane as the ABS; and
   the head slider further comprising a recess formed between the first and second arms and between the island pad and the rear portion of the trailing pad, wherein the recess extends to a depth below the air bearing surface that is greater than a depth the transverse channel is below the air bearing surface.

2. The head slider of claim 1 wherein the recess has a bottom surface that is between 10 nm and 10 μm below a top surface of the pads.

3. The head slider of claim 1 wherein the recess has a top with a first area, a bottom surface with a second area and side surfaces, and the side surfaces are tapered, such that the first area is greater than the second area.

4. A head slider for supporting a magnetic head above a surface of a magnetic storage disk in a hard disk drive, the head slider comprising:
   a leading edge;
   a trailing edge;
   first and second side edges extending between the leading and trailing edges; and an air bearing surface (ABS), comprising:
: a trailing pad comprising a rear portion adjacent the trailing edge of the slider; and first and second arms extending from the rear portion toward the leading edge of the slider and forming a channel there between;
: an island pad between the first and second arms; and
: a recess formed between the first and second arms and between the island pad and the rear portion of the trailing pad, wherein the recess comprises:
:: a first portion, the first portion having a first bottom surface;
:: a second portion, the second portion having a second bottom surface; and
:: a third portion the third portion having a third bottom surface; wherein
:: the first and second bottom surfaces are a first distance below a top surface of the pads;
:: the third bottom surface is a second distance below the top surface of the pads, the second distance being less than the first distance; and
:: the third portion is between the first and second portions.

5. The head slider of claim 4 wherein the first distance is between 10 nm and 10 μm and the second distance is between 10 nm and 10 μm.

6. A head slider for supporting a magnetic head above a surface of a magnetic storage disk in a hard disk drive, the head slider comprising:
: a leading edge;
: a trailing edge;
: first and second side edges extending between the leading and trailing edges; and
: an air bearing surface (ABS), comprising:
:: a trailing pad comprising a rear portion adjacent the trailing edge of the slider; and first and second arms extending from the rear portion toward the leading edge of the slider and forming a channel there between;
:: an island pad between the first and second arms; and
:: a recess formed between the first and second arms and between the island pad and the rear portion of the trailing pad, wherein the recess has a top with a first area, a bottom surface with a second area and side surfaces, and the side surfaces are vertical, such that the first area is substantially equal to the second area.

7. A hard disk drive having a magnetic storage disk and a head slider for supporting a magnetic head above a surface of the magnetic storage disk, the head slider comprising:
: a leading edge;
: a trailing edge;
: a transverse channel disposed between the leading edge and the trailing edge;
: first and second side edges;
: an air bearing surface (ABS) facing, and adjacent to, the surface of the disk, the ABS comprising:
:: a trailing pad comprising:
::: a rear portion adjacent the trailing edge of the slider;
:: first and second arms extending from the rear portion toward the leading edge of the slider and forming a channel there between, wherein the first and second arms are connected to the trailing pad; and
:: an island pad between the first and second arms, wherein the island pad is in the same plane as the ABS; and
: the head slider further comprising a recess between the first and second arms and between the island pad and the rear portion of the trailing pad, wherein the recess extends to a depth below the air bearing surface that is greater than a depth the transverse channel is below the air bearing surface.

8. The hard disk drive of claim 7 wherein the recess has a bottom surface that is between 10 nm and 10 μm below a top surface of the pads.

9. The hard disk drive of claim 7, wherein the recess has a top with a first area, a bottom surface with a second area and side surfaces, and the side surfaces are tapered, such that the first area is greater than the second area.

10. A hard disk drive having a magnetic storage disk and a head slider for supporting a magnetic head above a surface of the magnetic storage disk, the head slider comprising:
: a leading edge;
: a trailing edge;
: first and second side edges; and
: an air bearing surface (ABS) facing, and adjacent to, the surface of the disk, the ABS comprising:
:: a trailing pad comprising a rear portion adjacent the trailing edge of the slider; and first and second arms extending from the rear portion toward the leading edge of the slider and forming a channel there between;
:: an island pad between the first and second arms; and
:: a recess between the first and second arms and between the island pad and the rear portion of the trailing pad, wherein the recess comprises:
::: a first portion, the first portion having a first bottom surface;
::: a second portion, the second portion having a second bottom surface; and
::: a third portion the third portion having a third bottom surface; wherein
::: the first and second bottom surfaces are a first distance below a top surface of the pads;
::: the third bottom surface is a second distance below the top surface of the pads, the second distance being less than the first distance; and
::: the third portion is between the first and second portions.

11. The hard disk drive of claim 10 wherein the first distance is between 10 nm and 10 μm and the second distance is between 10 nm and 10 μm.

12. A hard disk drive having a magnetic storage disk and a head slider for supporting a magnetic head above a surface of the magnetic storage disk, the head slider comprising:
: a leading edge;
: a trailing edge;
: first and second side edges; and
: an air bearing surface (ABS) facing, and adjacent to, the surface of the disk, the ABS comprising:
:: a trailing pad comprising a rear portion adjacent the trailing edge of the slider; and first and second arms extending from the rear portion toward the leading edge of the slider and forming a channel there between;
:: an island pad between the first and second arms; and
:: a recess between the first and second arms and between the island pad and the rear portion of the trailing pad, wherein the recess has a top with a first area, a bottom surface with a second area and side surfaces, and the side surfaces are vertical, such that the first area is substantially equal to the second area.

* * * * *